(12) United States Patent
Nishimura et al.

(10) Patent No.: US 7,375,171 B2
(45) Date of Patent: May 20, 2008

(54) PROCESS FOR PREPARING VULCANIZABLE FLUORINE-CONTAINING ELASTOMER

(75) Inventors: Yousuke Nishimura, Settsu (JP); Masaki Irie, Settsu (JP); Sadashige Irie, Settsu (JP); Manabu Fujisawa, Settsu (JP); Satoshi Tokuno, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 215 days.

(21) Appl. No.: 10/542,545

(22) PCT Filed: Jan. 22, 2004

(86) PCT No.: PCT/JP2004/000519

§ 371 (c)(1), (2), (4) Date: Jul. 18, 2005

(87) PCT Pub. No.: WO2004/065436

PCT Pub. Date: Aug. 5, 2004

(65) Prior Publication Data

US 2006/0052548 A1    Mar. 9, 2006

(30) Foreign Application Priority Data

Jan. 24, 2003 (JP) ............... 2003-016788
Jul. 23, 2003 (JP) ............... 2003-278545

(51) Int. Cl.
    *C08F 14/18* (2006.01)
(52) U.S. Cl. ............ 526/250; 524/326.2; 524/345; 526/253; 526/255
(58) Field of Classification Search .......... 526/250, 526/253, 255; 525/326.2, 345
See application file for complete search history.

(56) References Cited

U.S. PATENT DOCUMENTS 6,509,429 B1 * 1/2003 Kitaichi et al. ............ 526/242
6,806,332 B2 * 10/2004 Royer et al. ............... 526/242
6,914,105 B1 * 7/2005 Charpentier et al. ....... 526/67

FOREIGN PATENT DOCUMENTS

| JP | 3-247608 A | | 11/1991 |
|----|------------|---|---------|
| JP | 05-222130 | * | 8/1993 |
| JP | 5-222130 A | | 8/1993 |
| JP | 05-222130 A | * | 8/1993 |
| JP | 7-173204 A | | 7/1995 |
| WO | WO-00/01741 | * | 1/2000 |
| WO | WO 00/01741 | | 1/2000 |
| WO | WO-00/01741 A1 | * | 1/2000 |
| WO | WO-00/47641 | * | 8/2000 |
| WO | WO 00/47641 A1 | | 8/2000 |
| WO | WO-00/47641 A1 | * | 8/2000 |
| WO | WO 01/34666 A1 | | 5/2001 |
| WO | WO-01/34666 A1 | * | 5/2001 |
| WO | WO-03/042259 A1 | * | 5/2003 |
| WO | WO 03/042559 A1 | | 5/2003 |
| WO | WO-2004/065436 A1 | * | 8/2004 |

* cited by examiner

*Primary Examiner*—Peter D. Mulcahy
(74) *Attorney, Agent, or Firm*—Sughrue Mion, PLLC

(57) ABSTRACT

The present invention provides a process for preparing a fluorine-containing elastomer in a high productivity comparable to that of non-iodine transfer polymerization process by carrying out an iodine transfer polymerization at high pressure. The present invention also provides a fluorine-containing elastomer prepared by this process, and fluorine-containing molded articles. The process is a batch copolymerization process conducted under conditions that the reduced temperature of the critical constant is at least 0.95 and the reduced pressure of the critical constant is at least 0.80 wherein the reduced temperature and the reduced pressure are calculated using the Peng-Robinson formula from the critical temperature, the critical pressure and the composition ratio of each of the monomers in the gaseous phase in a reaction vessel,
in which ethylenically unsaturated compounds containing at least one fluoroolefine are copolymerized in the presence of a compound having the formula: $R_f^1.I_x$ wherein $R_f^1$ is a saturated or unsaturated fluorohydrocarbon or chlorofluorohydrocarbon group having 1 to 16 carbon atoms, and x is the number of bonds of $R_f^1$ and an integer of 1 to 4.

6 Claims, No Drawings

PROCESS FOR PREPARING VULCANIZABLE FLUORINE-CONTAINING ELASTOMER

TECHNICAL FIELD

The present invention relates to a process for preparing a fluorine-containing elastomer at a high pressure according to iodine transfer polymerization. The invention also relates to a fluorine-containing elastomer having a few branches and a high terminal iodine content, which is prepared by the process, and to a fluorine-containing molded article having good balance between compression set and elongation at break, which is obtained by vulcanizing the elastomer.

BACKGROUND ART

Since fluorine-containing elastomers, including vinylidene fluoride-hexafluoropropylene (VdF-HFP) elastomers and tetrafluoroethylene (TFE)-perfluorovinyl ether elastomers, have excellent chemical resistance, solvent resistance and heat resistance, they have widely been used in the fields of automobile, semiconductor, chemical or the like industries as O-rings, gaskets, hoses, stem sealing, shaft sealing, diaphragm, and so on, which are used in severe environment.

Fluorine-containing elastomers used in such applications include iodine and fluorine-containing elastomers having highly active iodine atoms at the molecular ends. The iodine atoms at the molecular ends enable the iodine and fluorine-containing elastomers to have a good crosslinking efficiency, and thus the elastomers have an excellent vulcanizability. Furthermore, since there is no need to add chemical substances containing a metal component, the elastomers have been widely used as peroxide vulcanization molded articles.

A peroxide vulcanization type (see, for example, Japanese Unexamined Patent Publication No. 53-125491) is excellent in chemical resistance and steam resistance (hot water resistance), but is inferior in compression set to a polyol vulcanization type, and therefore it has not been suitable for use as sealing materials. This problem has been solved by introducing vulcanization sites into the elastomer main chain (see, for example, Japanese Unexamined Patent Publication No. 62-12734). However, the vulcanization density increases to result in lowered elongation at break. Therefore, it has been very difficult to have both excellent compression set and excellent elongation at break.

Meanwhile, as a process for preparing fluorine-containing elastomers by high pressure polymerization are known a polymerization method wherein at least one monomer is in a supercritical state (c.f. pamphlet of WO 00/47641) and an emulsion polymerization method wherein the monomer concentration in polymer particles is at least a specific level (c.f. pamphlet of WO 01/34666). Although these patent publications describe that the polymerization can be carried out in the presence of $R_f^1 \cdot I_x$ as used in the present invention, they do not disclose any working example therefor and any effects disclosed in the present invention.

Iodine and fluorine-containing elastomers have been prepared by an emulsion polymerization such as a so-called iodine transfer polymerization method (see, for example, Japanese Examined Patent Publication No. 63-41928). According to the method, however, it is necessary to hold down the amount of a polymerization initiator, in order to get a high terminal iodine content (see, for example, Masayoshi Tatemoto, p 19, 86/6, Symposium on Micromolecules, Control of Polymer Structure in Radical Polymerization, The Society of Polymer Science, Japan, (1986)), and accordingly the productivity cannot be improved. In polymerization systems wherein the amount of a polymerization initiator is not limited, the polymerization rate can easily be increased by increasing the amount of the initiator, but in iodine transfer polymerization systems, the increase of the amount of initiator cannot be expected, because the initiator terminal content exerts a great influence on physical properties of end products.

Various proposals for improving the productivity have been made. For example, a process for improving the productivity by continuously carrying out emulsion polymerization is proposed (see, for example, Japanese Unexamined Patent Publication Nos. 3-33108 and 3-221510). According to this process, good tensile strength and compression set, which are properties of iodine and fluorine-containing elastomers, cannot be obtained.

Further, a polymerization at a high pressure of at least 1.7 MPa (gauge pressure, hereinafter the same) is proposed (see, for example, Japanese Unexamined Patent Publication No. 5-222130), but the publication disclosed that a pressure range of 2.6 to 2.7 MPa is preferable and the pressure used in the Examples is within that range. Also, the polymerization time is more than 15 hours. Further, a microemulsion polymerization process is proposed (see, for example, Japanese Unexamined Patent Publication No. 63-8406). The process, however, requires the use of a fluorine oil or the like to form a microemulsion at the initial stage. Since the fluorine oil and the like remain in the products obtained therefrom as contamination sources, it is necessary to remove the contamination sources by washing.

In order to stabilize a polymerization system or to increase the rate of polymerization, the amount of an emulsifier might be increased. However, the increase of the amount is undesirable from the economic and environmental points and in addition, it is also necessary to remove the emulsifier by washing since the emulsifier itself impairs curing.

In order to solve these problems, it is proposed to carry out iodine transfer polymerization in a two stage emulsion polymerization manner (see, for example, a pamphlet of WO 00/01741). The two stage emulsion polymerization is a process wherein a large number of polymer particles are synthesized using a relatively large amount of an emulsifier in the first stage, and the resulting emulsion is then diluted to lower the concentration of polymer particles and the concentration of the emulsifier, and the polymerization in the second stage is carried out using the diluted emulsion. This process enables to increase the rate of polymerization twice or more without big change of existing facilities for emulsion polymerization with giving a uniform particle size and keeping the original characteristics. However, the productivity is still inferior to that of polymerization processes using no iodine compound. Further, the elastomers obtained by this process have no improved properties as compared to those obtained by a conventional iodine transfer polymerization process, and still have a problem in the sealing properties as mentioned above.

As described above, there has not yet been provided a process which satisfies both the productivity for the preparation of iodine and fluorine-containing elastomers and the properties thereof.

DISCLOSURE OF INVENTION

The present invention provides a process for preparing a fluorine-containing elastomer in a high productivity comparable to that of non-iodine transfer polymerization processes by carrying out an iodine transfer polymerization at a high pressure. The present invention also provides a fluorine-containing elastomer, prepared by this process, having a few polymer branches and a high terminal iodine content, and fluorine-containing molded articles having an excellent balance between compression set and elongation at break, which are obtained by vulcanization of the elastomer.

That is, the present invention relates to a process for preparing a fluorine-containing elastomer, which is a batch copolymerization process conducted under conditions that the reduced temperature of the critical constant is at least 0.95 and the reduced pressure of the critical constant is at least 0.80 wherein the reduced temperature and the reduced pressure are calculated using the Peng-Robinson formula from the critical temperature, the critical pressure and the composition ratio of each of the monomers in the gaseous phase in a reaction vessel, wherein ethylenically unsaturated compounds containing at least one fluoroolefine are copolymerized in the presence of a compound having the formula: $R_f^1.I_x$ wherein $R_f^1$ is a saturated or unsaturated fluorohydrocarbon or chlorofluorohydrocarbon group having 1 to 16 carbon atoms, and x is the number of bonds of $R_f^1$ and an integer of 1 to 4.

The pressure on polymerization varies depending on the kind and composition of monomers to be copolymerized and, for example, it can be at least 4 MPa. This pressure may preferably apply to, for example, the preparation of fluorine-containing elastomer, which are copolymers comprising vinylidene fluoride and hexafluoropropylene and having a molar ratio of vinylidene fluoride:hexafluoropropylene of 9:1 to 5:5. Further, the pressure may be, for example, at least 3 MPa. This pressure may preferably apply to, for example, the preparation of fluorine-containing elastomers which are copolymers comprising vinylidene fluoride, hexafluoropropylene and tetrafluoroethylene and having a molar ratio of vinylidene fluoride: hexafluoropropylene of 9:1 to 5:5, and having a tetrafluoroethylene content of at most 40% by mole based on the whole elastomer.

The number of particles of a fluorine-containing elastomer is preferably at least $5 \times 10^{13}$ per 1 g of water when the polymerization is finished.

It is preferable that the fluoroolefine is a compound having the formula:

$$CX^1X^2 = CX^3X^4$$

wherein $X^1$ to $X^3$ are each a hydrogen atom or a halogen atom, and $X^4$ is a hydrogen atom, a halogen atom, a carboxyl group, an alkyl group having 1 to 9 carbon atoms in which a part or all of the hydrogen atoms are substituted by fluorine atom and which may include an ether bonding oxygen atom, or an alkoxyl group having 1 to 9 carbon atoms in in which a part or all of the hydrogen atoms are substituted by fluorine atom and which may include an ether bonding oxygen atom, and wherein the fluoroolefine contains at least one fluorine atom.

The fluoroolefine is preferably selected from the group consisting of hexafluoropropylene, tetrafluoroethylene, trifluoroethylene, pentafluoropropylene, vinyl fluoride, hexafluoroisobutene, perfluoro-(alkyl vinyl ethers), polyfluorodienes and a compound having the following formula:

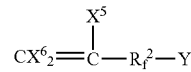

wherein Y is $-CH_2I$, $-OH$, $-COOH$, $-SO_2F$, $-SO_3M$ in which M is a hydrogen, $NH_4$ group or an alkali metal, a carboxylic acid salt, a carboxylic ester group, an epoxy group, a nitrile group or an iodine atom, $X^5$ and $X^6$ are the same or different and each is a hydrogen atom or a fluorine atom, $R_f^2$ is a bivalent fluorine-containing alkylene group having 0 to 40 carbon atoms which may include an ether bonding oxygen atom.

Preferably, the fluorine-containing elastomers have a Mooney viscosity of at least 30 at 100° C.

Also, the present invention relates to a peroxide vulcanizable fluorine-containing elastomer comprising 20 to 90% by mole of vinylidene fluoride repeating units and 10 to 80% by mole of hexafluoropropylene repeating units;
(a) which contains 0.01 to 10% by weight of an iodine atom in the elastomer,
(b) which has a number average molecular weight of from 1,000 to 300,000,
(c) which has a VdF branch ratio of at most 200 ppm, the ratio being calculated from the following formula:

$$\frac{\text{an area from } \delta F -96.5 \text{ to } -99.5 \text{ ppm}}{3 \times (\text{an area from } \delta F -88.0 \text{ to } -124.0 \text{ ppm})}$$

in which an acetone solution having a polymer concentration of about 20% is subjected to measurement on high-resolution $^{19}$F-NMR.

Molded articles obtained by vulcanization have preferably an elongation at break Eb of at least 200% and at most 550%, and a compression set CS of at least 5% and at most 30% at 200° C. for 72 hours.

The present invention relates to a curable fluorine-containing elastomer composition comprising a fluorine-containing elastomer and a curing agent.

BEST MODE FOR CARRYING OUT THE INVENTION

The process for preparing a fluorine-containing elastomer of the present invention is a batch copolymerization process conducted under the conditions that the reduced temperature of the critical constant is at least 0.95 and the reduced pressure of the critical constant is at least 0.80 wherein the reduced temperature and the reduced pressure are calculated from the critical temperature, the critical pressure and the composition ratio of each of the monomers in the gaseous phase of a reaction vessel using the Peng-Robinson formula; wherein ethylenically unsaturated compounds containing at least one fluoroolefine are copolymerized in the presence of a compound having the formula: $R_f^1.I_x$ wherein $R_f^1$ is a saturated or unsaturated fluorohydrocarbon or chlorofluorohydrocarbon group having 1 to 16 carbon atoms, and x is the number of bonds of $R_f^1$ and an integer of 1 to 4.

In the present invention, by carrying out an iodine transfer polymerization under a high pressure, the polymerization rate is greatly increased even if the amount of the polymerization initiator is small, thus a high productivity comparable to that of non-iodine transfer polymerization processes is achived. The elastomers prepared according to this process has a few branches and a high terminal iodine content, and can provide excellent fluorine-containing molded articles having a small compression set and a high elongation at break.

The feature of the preparation process of the invention resides in that iodine transfer polymerization is carried out under a high pressure. The iodine transfer polymerization process is not particularly restricted. It is preferable from the viewpoint of productivity that the number of a particles of a fluorine-containing polymer is large when the polymerization is finished, and a seed polymerization described in WO 00/01741 is preferable as a means for realizing it.

As a reaction vessel used in the present invention, a pressure vessel is used because the polymerization is carried out under pressure. To the reaction vessel is added an aqueous medium (usually deionized water) for emulsion polymerization, containing polymer particles having the same composition as the target polymer to form the aqueous phase.

The reaction vessel is composed of this aqueous phase and a gaseous phase, and after the gaseous phase is replaced with nitrogen or the like, the polymerizable monomers are introduced. Subsequently, the contents of the reaction vessel, particularly the aqueous phase, are stirred and the polymerizable monomers are supplied from the gaseous phase to the aqueous phase. The monomers supplied to the aqueous phase permeate into the polymer particles to raise the concentration of polymerizable monomers in the polymer particles. By continuing to supply the monomers into the gaseous phase, the monomer concentration in the polymer particles reaches saturation (in other words, the rate of monomer supply into the aqueous phase reaches equilibrium) and then a polymerization initiator and an iodine compound are added to start the polymerization.

As the polymerization is continued, the monomers are consumed and the monomer concentration in the produced polymer particles decreases. Therefore, the monomers (additional monomers) are constantly continued to be supplied into the polymer particles.

Although the ratio of the additional monomers varies depending on the composition of the monomers to be added and the composition of the desired polymer, it is preferable to be a ratio which keeps the monomer composition in the reaction vessel in the initial stage of the polymerization constant.

The number of particles of the fluorine-containing polymer at the time of the completion of the polymerization is preferably at least $5\times10^{13}$ per g of water, more preferably at least $1.0\times10^{14}$ per g of water. If the number of the particles is less than $5\times10^{13}$, not only the reaction speed lowers, but also the particle size becomes large to be unstable, resulting in the tendency to increase adhesion of the polymer to the polymerization vessel.

Polymerization processes to increase the number of particles obtained when the polymerization is finished include, in addition to seed polymerization, a microemulsion process disclosed in Japanese Examined Patent Publication Nos. 63-8406 and 62-288609 and a general process in which the amount of an emulsifier is increased. Of these, because the microemulsion process requires the use of a fluorine oil for forming a microemulsion at the initial stage and the oil remaining in the product becomes a contamination source, washing is necessary. Also, the increase of the emulsifier is effective merely for stabilizing the polymerization system or increasing the polymerization rate, but bubbling phenomenon easily occurs before and after the polymerization, and the emulsifier remaining in the obtained elastomer is easy to hinder curing. Furthermore, this process is not preferable from the viewpoints of cost and environment. On the other hand, the seed polymerization does not have these problems, and shows noticeable effects in iodine transfer system.

In the preparation process of the present invention, a batch copolymerization process is conducted under the conditions that the reduced temperature for correcting small error is at least 0.95, preferably at least 0.97, and the reduced pressure is at least 0.80, preferably at least 0.85, which are calculated from the critical temperature and critical pressure of a monomer mixture in the gaseous phase which are led from the critical temperature, the critical pressure of each of the monomers and the initial monomer composition ratio according to the Peng-Robinson formula. Both of the reduced temperature and reduced pressure of the monomer mixture in the gaseous phase are higher than the specified values, whereby it is made possible to conduct the polymerization under high monomer density so as to increase the polymerization rate. In addition, since polymers having a small amount of branches in the main chain and a small amount of ionic terminals are obtained, the compression set is extremely improved. In the instant specification, the reduced temperature is determined by the formula:

$$\text{Reduced temperature } T_R = T/T_c$$

wherein T is an actual polymerization temperature and $T_c$ is a critical temperature calculated using the Peng-Robinson formula, and the reduced pressure is determined by the formula:

$$\text{Reduced pressure } P_R = P/P_c$$

wherein P is an actual polymerization pressure and $P_c$ is a critical pressure calculated using the Peng-Robinson formula.

Described below is the Peng-Robinson formula, which determines the critical temperature and the critical pressure. It is commonly known that composition distribution tends to occur in the obtained polymer the higher the initial monomer density in the polymerization vessel is and that particularly, the monomer density of the initial monomers increases sharply from near the critical point. However, when at least two monomer components are copolymerized, the critical point of the gaseous phase monomer mixture varies depending on the type and composition ratio of the monomers. The Peng-Robinson formula is employed as a method for estimating the critical point of the monomer mixture from the critical temperature and composition ratio. The principle of this formula is described in D. Y. Peng and D. B. Robinson, "A New Two-Constant Equation of State", Ind. Eng. Chem. Fundam., Vol. 15, (1976), pp. 59-64. As an overview, the principle is based on the following formula and for actual calculation, a process simulator such as Aspen Plus (made by Aspen Technology, Inc.) can be used.

An outline of the Peng-Robinson formula is as follows.

$$P = RT/(V_m - b) - a/[V_m(V_m + b) + b(V_m - b)]$$

$$a = \sum_i \sum_j x_i x_j (a_i a_j)^{0.5}$$

$$b = \sum_i x b_i$$

In the above formula, $a_i$ and $\alpha_i$ are respectively as defined below.

$$a_i = \alpha_i 0.45724 R^2 T_{ci}^2 / P_{ci}$$

$$\alpha_i(T) = [1 + m_i(1 - T_{ci}^{0.5})]^2$$

$$m_i = 0.37464 + 1.54226\omega_i - 0.26992\omega_i^2$$

$$b_i = 0.0778 R T_{ci} / P_{ci}$$

Also, each parameter represents the following.
P: pressure
T: temperature
$V_m$: volume
R: gas constant
$X_i$: composition ratio of monomer component i
$T_{ci}$: critical temperature of monomer component i
$P_{ci}$: critical pressure of monomer component i
$\omega_i$: eccentric factor of monomer component i As a specific calculation example, the critical temperature and the critical pressure when the composition inside the polymerization vessel is VdF/HFP=36/64 (% by mole) are calculated according to the Peng-Robinson formula using Aspen Plus Ver. 11.1, and $T_c$=87.7° C. and $P_c$=3.05 MPa are found. When converted by reduced temperature $T_R$=0.95 and reduced pressure $P_R$=0.80, the polymerization conditions in this case are T=at least 69.7° C. and P=at least 2.44 MPa.

When the reduced temperature is less than 0.95 or the reduced pressure is less than 0.80, the monomer concentration in the polymer particles does not reach saturation and not only does the polymerization rate decrease, but also obtaining the target polymer tends to become difficult. Also, within the above temperature and pressure that satisfy the conditions calculated from the above formula, the polymerization temperature is more preferably 10 to 120° C., particularly preferably 30 to 100° C., and the polymerization pressure is preferably at least 3 MPa, more preferably at least 3.5 MPa, further preferably at least 4 MPa. Also, the upper limit of the pressure is not particularly limited, but in consideration of handling of the monomer and reaction facility costs, the pressure is preferably at most 15 MPa, more preferably at most 12 MPa.

Furthermore, stirring is preferably conducted. By stirring, the monomer concentration in the polymer particles can be kept high throughout the polymerization.

As the stirring means, for example, an anchor blade, a turbine blade and an inclined blade can be used, but from the viewpoints that diffusion of the monomers and dispersion stability of the polymer are favorable, stirring is preferably conducted by a large-scale blade such as FULLZONE or MAXBLEND.

The stirring machine can be a horizontal stirring machine or a vertical stirring machine.

The reaction system has a substantial monomer phase part. Herein, "having a substantial monomer phase part" denotes conducting a polymerization in the state that the volume occupied by a medium such as water is at most 90%, preferably at most 80%, of the volume of a polymerization vessel. If the volume is more than 90%, the monomer is difficult to be supplied into the medium, leading to the tendency to lower the polymerization rate or deteriorate physical properties of the polymer.

In the general formula: $R_f^1 \cdot I_x$, which expresses the iodine compound used in the invention, $R_f^1$ is a saturated or unsaturated fluorohydrocarbon or chlorofluorohydrocarbon group having 1 to 16 carbon atoms, preferably a perfluoroalkyl group having 4 to 8 carbon atoms. When the number of carbon atoms is more than 16, the reactivity tends to lower.

In the general formula: $R_f^1 \cdot I_x$, which expresses the iodine compound, x is the number of the bonds of $R_f^1$ and an integer of at least 1 and at most 4, preferably at least 2 and at most 3. Even if x exceeds 4, the compound can be used but is not preferable from the viewpoint of synthesis cost. From the viewpoint that the number of polymer branches is few, x is most preferably 2.

The carbon-iodine bond of the iodine compound is relatively weak, and is cleaved in the presence of a radical generation source to produce radicals. Since the produced radicals have a high reactivity, they cause addition and growth reactions of monomers and, after that, iodine is pulled out from the iodine compound to terminate the reaction. The thus obtained fluorine-containing elastomers wherein iodine atoms are bonded to the carbon atoms at the molecular ends, can be efficiently cured since the terminal iodine atoms serve as effective vulcanization sites.

Examples of the iodine compound having the general formula: $R_f^1 \cdot I_x$ are monoiodoperfluoromethane, monoiodoperfluoroethane, monoiodoperfluoropropane, monoiodoperfluorobutane [e.g., 2-iodoperfluorobutane, and 1-iodoperfluoro (1,1-dimethylethane)], monoiodo-perfluoropentan [e.g., 1-iodoperfluoro(4-methylbutane)], 1-iodo-perfluoro-n-octane, monoiodoperfluorocyclobutane, 2-iodoperfluoro (1-cyclobutylethane)cyclohexane, monoiodoperfluorocyclohexane, mono-iodotrifluorocyclobutane, monoiododifluoromethane, monoiodo-monofluoromethane, 2-iodo-1-hydroperfluoroethane, 3-iodo-1-hydroperfluoropropane, monoiodomonochlorodifluoromethane, monoiododichloromonofluoromethane, 2-iodo-1,2-dichloro-1,1,2-trifluoroethane, 4-iodo-1,2-dichloroperfluorobutane, 6-iodo-1,2-dichloroperfluorohexane, 4-iodo-1,2,4-trichloroperfluorobutane, 1-iodo-2,2-dihydroperfluoropropane, 1-iodo-2-hydroperfluoropropane, monoiodotrifluoroethylene, 3-iodoperfluoropropene-1,4-iodoperfluoropentene-1,4-iodo-5-chloroperfluoropentene-1,2-iodoperfluoro(1-cyclobutenyl ethane), 1,3-diiodoperfluoropropane, 1,4-diiodoperfluoro-n-butane, 1,3-diiodo-2-chloroperfluoropropane, 1,5-diiodo-2,4-dichloroperfluoro-n-pentane, 1,7-diiodoperfluoro-n-octane, 1,2-di (iododifluoromethyl)-perfluorocyclobutane, 2-iodo-1,1,1-trifluoroethane, 1-iodo-1-hydroperfluoro(2-methylethane), 2-iodo-2,2-dichloro-1,1,1-trifluoroethane, 2-iodo-2-chloro-1,1,1-trifluoroethane, and the like. Furthermore, the hydrocarbon group of $R_f^1$ may contain a functional group such as ether bonding oxygen atom, thioether bonding sulfur atom, and carboxyl group. Examples thereof are 2-iodoperfluoroethyl perfluorovinyl ether, 2-iodoperfluoroethyl perfluoroisopropyl ether, 3-iodo-2-chloroperfluorobutyl perfluoromethyl thioether, 3-iodo-4-chloroperfluorobutylic acid, and the like.

Of these, 1,4-diiodoperfluoro-n-butane is preferable from the viewpoints of reactivity, economy and safety.

The iodine compounds can be suitably prepared by known methods. For example, 2-iodoperfluoropropane can be prepared by reacting hexafluoropropene with iodine in the presence of potassium fluoride, 1,5-diiodo-2,4-dichloroperfluoro-n-pentane can be prepared by reacting a silver salt of 3,5-dichloroperfluoro-1,7-heptanedioic acid with iodine, and 4-iodo-5-chloroperfluoro-1-pentene can be prepared by reacting perfluoro-1,4-pentadiene with iodine chloride.

The amount of the iodine compound added is preferably from 0.05 to 2.0% by weight based on the fluorine-containing elastomer. When the amount is less than 0.05% by weight, vulcanization occurs insufficiently, so the compression set (CS) tends to deteriorate. When the amount is more than 2.0% by weight, the crosslinking density is too high, thus resulting in tendency to deteriorate properties as a rubber such as elongation.

Monomers which form the fluorine-containing elastomers with the above-mentioned iodine compound contain at least one fluoroolefine, and may contain an ethylenically unsaturated compound other than the fluoroolefine as a comonomer for the fluoroolefine.

This composition is preferable for forming the fluorine-containing elastomers.

Compounds of the formula: $CX^1X^2{=}CX^3X^4$ are preferable as the fluoroolefine used in the present invention. In the formula, $X^1$ to $X^3$ are a hydrogen atom or a halogen atom, and $X^4$ is a hydrogen atom, a halogen atom, a carboxyl group, an alkyl group having 1 to 9 carbon atoms in which a part or all of the hydrogen atoms are substituted by fluorine atom, or an alkoxyl group having 1 to 9 carbon atoms in which a part or all of the hydrogen atoms are substituted by fluorine atom, and the fluoroolefine contains at least one fluorine atom.

Examples of the fluoroolefine shown by the formula: $CX^1X^2{=}CX^3X^4$ are hexafluoropropylene (HFP), vinylidene fluoride (VdF), tetrafluoroethylene (TFE), trifluoroethylene, pentafluoropropylene, vinylfluoride, hexafluoroisobutene, chlorotrifluoroethylene (CTFE), trifluoropropylene, pentafluoropropylene, tetrafluoropropylene, hexafluoroisobutene, perfluoro(alkyl vinyl ether) (PAVE), and the like. Vinylidene fluoride (VdF), hexafluoropropylene (HFP), tetrafluoroethylene (TFE) and perfluoro(alkyl vinyl ether) (PAVE) are preferable from the viewpoint that monomer compositions for elastomer are easy to be obtained.

Perfluoro(alkyl vinyl ethers) are preferable also from the viewpoints of cold resistance and chemical resistance.

Examples of the perfluoro(alkyl vinyl ether) are perfluoro(methyl vinyl ether) (PMVE), perfluoro(ethyl vinyl ether) (PEVE), perfluoro(propyl vinyl ether) (PPVE) and the like.

The fluoroolefines other than the compounds: $CX^1X^2{=}CX^3X^4$ include fluoroolefines having the formulae:

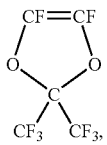  $CF_2{=}CFOCF_2CF{=}CF_2$ functional group-containing fluoroolefines having the formula:

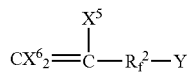

wherein Y is $-CH_2I$, $-OH$, $-COOH$, $-SO_2F$, $-SO_3M$ in which M is hydrogen, $NH_4$ group or an alkali metal, a carboxylic acid salt, a carboxylic ester group, epoxy group, nitrile group or iodine atom, $X^5$ and $X^6$ are the same or different and each is hydrogen atom or fluorine atom, $R_f^2$ is a divalent fluorine-containing alkylene group having 0 to 40 carbon atoms which may contain an ether bonding oxygen atom; polyfluorodienes, and the like.

The functional group-containing fluoroolefines are preferable as a functional monomer for surface modification or for increasing the crosslinking density, and the polyfluorodienes are preferable from the viewpoint of crosslinking efficiency.

Examples of the functional group-containing fluoroolefine are

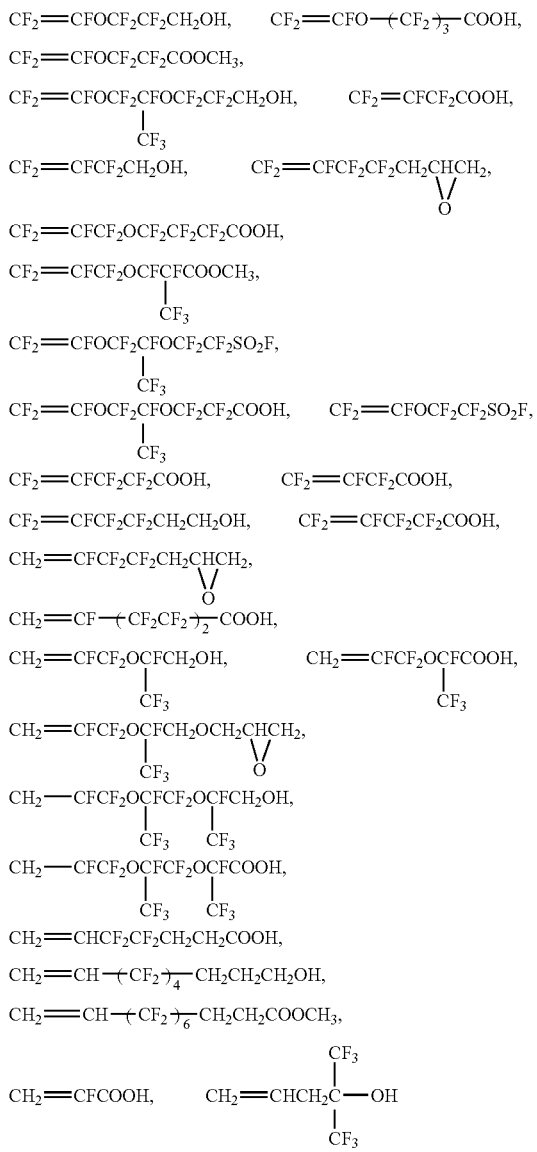

and the like.

A monomer having the formula: $CF_2{=}CFOCF_2CF_2CH_2I$, disclosed in the patent publication 2, is preferable as the functional group-containing fluoroolefine from the viewpoint of increasing the corsslinking density.

Examples of the polyfluorodienes are $CF_2{=}CFCF{=}CF_2$, $CF_2{=}CFCF_2OCF{=}CF_2$ and the like.

The ethylenically unsaturated compounds other than the fluoroolefines are not particularly limited. Examples thereof are α-olefine monomers having 2 to 10 carbon atoms such as ethylene (ET), propylene, butene and pentene; alkyl vinyl ethers having an alkyl group with 1 to 20 carbon atoms such as methyl vinyl ether, ethyl vinyl ether, propyl vinyl ether, cyclohexyl vinyl ether, hydroxybutyl vinyl ether, butyl vinyl ether; and the like.

These compounds are preferable from the viewpoints of low cost and resistance to amines.

The combination of monomers for forming the fluorine-containing elastomers of the present invention includes a combination containing at least one fluoroolefine of the formula: $CX^1X^2{=}CX^3X^4$, a combination containing at least one fluoroolefine other than $CX^1X^2{=}CX^3X^4$, and a combination containing at least one fluoroolefine of the formula: $CX^1X^2{=}CX^3X^4$ and at least one fluoroolefine other than $CX^1X^2{=}CX^3X^4$. Each combination may contain an ethylenically unsaturated compound other than the fluoroolefines as a comonomer.

Of the combinations comprising the fluoroolefine and the ethylenically unsaturated compound other than the fluoroolefine, a combination comprising vinylidene fluoride (VdF) and an ethylenically unsaturated compound copolymerizable therewith is preferable when it is desired to form a fluorine-containing elastomer having good vulcanizability at low cost.

Mooney viscosity of the fluorine-containing elastomer prepared by the process of the present invention is preferably at least 30, more preferably at least 35 at 100° C. Peroxide vulcanization of such elastomers gives products having higher elongation and excellent compression set (CS) and roll processability as compared with conventional elastomers having the same viscosity. The higher the viscosity, the compression set (CS) becomes more and more excellent than that of conventional ones.

Even when Mooney viscosity is less than 30, the superiority to conventional ones is kept, though the difference between the ones of the invention and conventional ones tends to become smaller because even the conventional ones can have an improved crosslinking efficiency in the above viscosity range.

The novel fluorine-containing elastomer of the present invention contains 20 to 90% by mole of vinylidene fluoride repeating units and 10 to 80% by mole of hexafluoropropylene repeating units; and
(a) contains 0.01 to 10% by weight of an iodine atom in the elastomer,
(b) has a number average molecular weight of from 1,000 to 300,000,
(c) has a VdF branch ratio of at most 200 ppm, which is determined by measuring an acetone solution having a polymer concentration of about 20% on high-resolution $^{19}$F-NMR, and calculating from the following formula:

$$\frac{\text{an area from } \delta F \text{ -96.5 to -99.5 ppm}}{3 \times (\text{an area from } \delta F \text{ -88.0 to -124.0 ppm})}$$

and it is a peroxide curable fluorine-containing elastomer.

The fluorine-containing elastomer of the invention can be prepared by the process as mentioned above.

The fluorine-containing elastomer of the invention contains preferably 20 to 90% by mole, more preferably 40 to 85% by mole, of repeating units of vinylidene fluoride (VdF), and preferably 10 to 80% by mole, more preferably 15 to 60% by mole, of repeating units of vinylidene fluoride (VdF) and hexafluoropropylene (HFP).

The fluorine-containing elastomeric binary copolymer of VdF and HFP has preferably a VdF branch ratio as defined below of at most 200 ppm, more preferably at most 150 ppm. When the VdF branch ratio is more than 200 ppm, the vulcanization efficiency is lowered since particularly the number of iodine terminals is decreased in peroxide-vulcanizable elastomers containing iodine, so the physical properties such as compression set (CS) tends to be deteriorated.

The fluorine-containing elastomer comprising VdF/HFP and having the VdF branch ratio of at most 200 ppm may be copolymerized with other monomers so long as the properties are not impaired.

With respect to the fluorine-containing elastomers comprising VdF/HFP and having a VdF branch ratio of at most 200 ppm, other monomers may be copolymerized so long as the properties are not impaired. Tetrafluoroethylene is exemplified as an example of the other monomers, and exemplified are copolymers compring 30 to 89% by mole of vinylidene fluoride (VdF) repeating units, 10 to 50% by mole of hexafluoropropylene (HFP) repeating units, and 0.1 to 40% by mole of tetrafluoroethylene (TFE) repeating units.

An acetone solution of a polymer to be determined (concentration of about 20%) is subjected to measurement on high-resolution $^{19}$F-NMR, and the "VdF branch ratio" is calculated according to the following calculation formula:

$$\frac{\text{an area from } \delta F \text{ -96.5 to -99.5 ppm}}{3 \times (\text{an area from } \delta F \text{ -88.0 to -124.0 ppm})}$$

The branch as defined above expresses an area of $CF_2$ groups adjacent to the branched CH group in mainly the following structure unit:

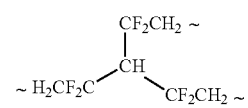

and the area appears within the range of $\delta F$ −96.5 to −99.5 ppm. The branch ratio is a ratio of this peak area to the sum of areas of $CF_2$ groups appearing within the range of $\delta F$ −88.0 to −124.0 ppm. Since there are three branch-adjacent $CF_2$ groups with respect to one $CF_2$ chain, the branch ratio based on unit VdF is calculated as one third the measurement value.

The high-resolution, herein, means a measurement using a spectrometer with at least 500 MHz.

It is preferable that the fluorine-containing elastomer contains 0.01 to 10% by weight, especially 0.05 to 2.0% by weight, of iodine atom. When the iodine atom content is less than 0.05% by weight, the vulcanization occures insufficiently, so the compression set tends to be deteriorated. When the content is more than 2.0% by weight, the crosslinking density is too high, so the properties as a rubber such as elongation tend to be deteriorated.

The number average molecular weight of the elastomer is preferably from 1,000 to 300,000. When the molecular weight is less than 1,000, the viscosity is so low that handling properties tend to lower. When it exceeds 300,000, the viscosity is so high that handling properties tend to lower.

The molecular weight distribution (weight average molecular weight Mw/number average molecular weight Mn) is preferably at least 1.5, more preferably at least 1.8.

If the molecular weight distribution is less than 1.5, the roll processability tends to be deteriorated, though the physical properties are not problematic.

Segmented elastomers obtained by successively polymerizing crystalline segments onto the obtained fluorine-containing elastomer are suitably used as thermoplastic polymers.

The crystalline segments are not particularly limited. Examples thereof are tetrafluoroethylene, perfluoro(propyl) vinyl ether, hexafluoropropylene, ethylene (ET), propylene, butene, and the like.

In the preparation process of the present invention, oil soluble radical polymerization initiators or water soluble radical initiators can be used as a polymerization initiator.

Oil soluble peroxides well known are usually used as the oil soluble radical polymerization initiator used in the present invention. Examples thereof are, for instance, dialkylperoxycarbonates such as diisopropylperoxydicarbonate and di-sec-butylperoxydicarbonate; peroxyesters such as t-butylperoxyisobutylate and t-butylperoxypivalate; dialkyl peroxides such as di-t-butyl peroxide; di[perfluoro (or fluorochloro)acyl] peroxides such as di($\omega$-hydrododecafluoroheptanoyl) peroxide, di($\omega$-hydrotetradecafluoroheptanoyl) peroxide, di($\omega$-hydrohexadecafluorononanoyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di($\omega$-chlosrohexafluorobutyryl) peroxide, di($\omega$-chlorodecafluorohexanoyl) peroxide, di($\omega$-chlorotetradecafluorooctanoyl) peroxide, $\omega$-hydrododecafluoroheptanoyl-$\omega$-hydrohexadecafluorononanoyl peroxide, $\omega$-chlorohexafluorobutyryl-$\omega$-chlodecafluorohexanoyl peroxide, $\omega$-hydrododecafluoroheptanoylperfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorodotoriacontafluorodocosanoyl) peroxide.

Since peroxycarbonates such as diisopropyl peroxycarbonate (IPP) and di-n-propyl peroxycarbonate (NPP), which are typical oil soluble initiators, have an explosion hazard and are expensive and, moreover, have a problem that scales easily adhere to the wall of a polymerization vessel during polymerization reaction, the use of the water soluble radical polymerization initiators are preferable.

Well known water soluble peroxides are usually used as the water soluble radical polymerization initiator. Examples thereof are, for instance, ammonium, potassium and sodium salts of persulfuric acid, perboric acid, perchloric acid, perphosphoric acid, and percarbonic acid, t-butyl permaleate, t-butyl hydroperoxide, and the like.

The amount of the water soluble radical initiator is not particularly limited, and at least an amount which does not decrease the polymerization rate significantly (for example, several ppm based on water) may be added all at once at the beginning of polymerization or intermittently or continuously. The upper limit is within the range wherein polymerization reaction heat can be removed, in consideration of apparatus.

In the preparation process of the present invention, an emulsifier, a molecular weight adjuster and a pH adjuster can also be added. The molecular weight adjuster can be added all at once in the beginning or can be added continuously or divided into portions.

As the emulsifier, a non-ionic surfactant, an anionic surfactant and a cationic surfactant can be used and particularly, a fluorine-type anionic surfactant such as ammonium perfluorooctanate is preferable. The amount (based on polymerization water) is preferably 50 to 5,000 ppm.

Examples of the molecular weight adjuster are, for example, esters such as dimethyl malonate, diethyl malonate, methyl acetate, ethyl acetate, butyl acetate and dimethyl succinate, isopentane, isopropanol, acetone, various mercaptans, carbon tetrachloride, cyclohexane, monoiodo methane, 1-iodomethane, 1-iodo-n-propane, isopropyl iodide, diiodo methane, 1,2-diiodomethane and 1,3-diiodo-n-propane.

Also, a buffer can be added accordingly, but the amount thereof is within the range that the effects of the present invention are not impaired.

The fluorine-containing elastomer composition of the present invention comprises the fluorine-containing elastomer and a curing agent, and may contain a curing accelerator.

The curing agent that can be used in the present invention is selected accordingly depending on the vulcanization type that is employed. As the vulcanization type, polyamine vulcanization type, polyol vulcanization type and peroxide vulcanization type can be employed, but in particular the effects of the present invention are exhibited significantly when vulcanized by peroxide vulcanization type.

Examples of the curing agent are, but not limited to, polyhydroxy compounds such as bisphenol AF, hydroquinone, bisphenol A and diaminobisphenol AF as to polyol vulcanization; organic peroxides such as $\alpha,\alpha'$-bis(t-butylperoxy)diisopropylbenzene, 2,5-dimethyl-2,5-di(t-butylperoxy)hexane and dicumyl peroxide as to peroxide vulcanization; and polyamine compounds such as hexamethylenediamine carbamate and N,N'-dicinnamylidene-1,6-hexamethylenediamine as to polyamine vulcanization.

Of these, 2,5-dimethyl-2,5-di(t-butylperoxy)hexane is preferable from the viewpoints of vulcanizability and handling.

The amount of the curing agent is 0.01 to 10 parts by weight, preferably 0.1 to 5 parts by weight, based on 100 parts by weight of the elastomer. When the amount of the curing agent is less than 0.01 part by weight, properties of fluorine-containing molded articles tend to deteriorate because of insufficient vulcanization degree. When the amount is more than 10 parts by weight, the vulcanization density becomes too high, so the vulcanization requires a long time, and it is also economically unfavorable.

As a curing accelerator for the polyol vulcanization, there can be used organic bases that have been usually used for vulcanizing elastomers, such as various quaternary ammonium salts, quaternary phosphonium salts, cyclic amines and monofunctional amine compounds. Examples thereof are, for instance, quaternary ammonium salts such as tetrabutylammonium bromide, tetrabutylammonium chloride, benzyltributylammonium chloride, benzyltriethylammonium chloride, tetrabutylammonium hydrogen sulfate and tetrabutylammonium hydroxide; quaternary phosphonium salts such as benzyltriphenylphosphonium chloride, tributylallylphosphonium chloride, tributyl-2-methoxypropylphosphonium chloride and benzylphenyl(dimethylamino)phosphonium chloride; monofunctional amines such as benzylmethyl amine and benzylethanol amine; and cyclic amines such as 1,8-diazabicyclo[5,4,0]-undec-7-ene.

Examples of the curing accelerator for the peroxide vulcanization are triallyl cyanurate, triallyl isocyanurate (TAIC), tris(diallylamine-s-triazine), triallyl phosphite, N,N-diallylacrylamide, hexaallylphosphoramide, N,N,N', N'-tetraallyltetraphthalamide, N,N,N'N'-tetraallylmalonamide, trivinyl isocyanurate, 2,4,6-trivinylmethyltrisiloxane, tri(5-norbornene-2-methylene)cyanurate, and the like. Of these, triallyl isocyanurate (TAIC) is preferable from the viewpoint of vulcanizability and properties of vulcanized products.

The amount of the curing accelerator is 0.01 to 10 parts by weight, preferably 0.1 to 5.0 parts by weight, based on 100 parts by weight of the elastomer. When the amount of the curing accelerator is less than 0.01 part by weight, the vulcanization time tends to become too long to be impractical, and when the amount is more than 10 parts by weight, the vulcanization time becomes too short and also, compression set of the molded articles tends to deteriorate.

Also, usual additives, e.g., fillers, processing aids, carbon black, inorganic fillers, metal oxides such as magnesium oxide, and metal hydroxides such as calcium hydroxide, can be used as long as the effects of the present invention are not impaired.

The methods for preparing and curing the composition of the present invention are not particularly limited and known methods can be employed, such as compression molding, extrusion molding, transfer molding and injection molding.

It is preferable that molded articles obtained by vulcanizing the fluorine-containing elastomer using a curing agent have an elongation at break (Eb) of 200 to 550%. Molded articles having an elongation at break of less than 200% do not show a so-called rubber-like behavior, and tend to be unsuitable for use as sealing materials. When the elongation Eb is more than 550%, the crosslinknig density is so low that the compression set (CS) tends to deteriorate.

The compression set (CS) at 200° C. for 72 hours of molded articles is preferably 5 to 30%, more preferably 7 to 25%. When the compression set is less than 5%, the sealing property is good, but the elongation usually tends to be too small. When it exceeds 30%, properties as a sealing material tends to deteriorate.

Herein, the vulcanization in the present invention denotes vulcanization under the following standard vulcanization conditions using the following standard composition.

(Standard Composition)

| Fluorine-containing elastomer | 100 parts by weight |
| Triallyl isocyanurate (TAIC) | 4 parts by weight |
| Perhexa 25B | 1.5 parts by weight |
| Carbon black MT-C | 20 parts by weight |

(Standard Vulcanization Conditions)
Kneading method: Roll kneading
Press vulcanization: 10 minutes at 160° C.
Oven vulcanization: 4 hours at 180° C.

According to the process of the present invention, the polymerization time is greatly shortened and, fruthermore, the roll processability of the obtained fluorine-containing elastomers is improved, as compared with conventional iodine transfer polymerization at low pressure. Comparing the elastomers of the present invention with fluorine-containing elastomers obtained by the low pressure iodine transfer polymerization with respect to those having the same Mooney viscosity, the elastomers obtained by the low pressure polymerization have a tendency that curing agent (TAIC) precipitates during kneading and consequently the elastomers are east to cut. On the contrary, the elastomers of the present invention do not show such a phenomenon.

The compositions comprising the fluorine-containing elastomer obtained according to the present invention and a curing agent are suitably used as coating materials, gaskets integrated with a substrate including an inorganic material such as metal or ceramic obtained by dispenser molding to the substrate, packings, multi-layer products prepared by coating onto a substrate including an inorganic material such as metal or ceramic, gaskets for magnetic recording devices, sealing materials for fuel battery, sealing materials for cleaned facility, and the like.

Evaluation

<Weight Average Molecular Weight (Mw) and Number Average Molecular Weight (Mn)>
Machine: HLC-8000 (made by Tosoh Corporation)
Showa Column:
   GPC KF-806M 2 columns
   GPC KF-801 1 column
   GPC KF-801 2 columns
Detector: differential refractometer
Developing solvent: tetrahydrofuran
Temperature: 35° C.
Sample concentration: 0.1% by weight
Standard sample: various monodispersional polystyrenes ((Mw/Mn)=1.14(Max)), TSK standard POLYSTYRENE (made by Tosoh Corporation)

<Mooney Viscosity>
The Mooney viscosity is measured according to ASTM-D1646 and JIS K 6300.
Measuring instrument: MV 2000E type made by ALPHA TECHNOLOGIES
Rotor rotational speed: 2 rpm
Measuring temperature 100° C.

<Compression Set (CS)>
The standard composition described below is subjected to primary press vulcanization and secondary oven vulcanization under the standard vulcanization conditions to give an O-ring (P-24). The compression set (CS) after primary press cure and the compression set after secondary oven cure are measured according to JIS-K-6301 (in which a sample held at 200° C. for 72 hours under 25% compression and then allowed to stand for 30 minutes in a constant temperature room of 25° C. is measured).

(Standard Composition)

| Fluorine-containing elastomer | 100 parts by weight |
| Triallyl isocyanurate (TAIC) | 4 parts by weight |
| Perhexa 25B | 1.5 parts by weight |
| Carbon black MT-C | 20 parts by weight |

(Standard Vulcanization Conditions)
Kneading method: Roll kneading
Press cure: 10 minutes at 160° C.
Oven cure: 4 hours at 180° C.

<100% Modulus (M100)>
The standard composition is subjected to primary press cure and secondary oven cure under the standard vulcanization conditions to give a sheet of 2 mm thickness, and the 100% modulus thereof is measured according to JIS-K-6251.

<Tensile Strength at Break (Tb) and Elongation at Break (Eb)>

The standard composition is subjected to primary press cure and secondary oven cure under the standard vulcanization conditions to give a sheet of 2 mm thickness, and the sheet is subjected to measurement according to JIS-K-6251.

<Hardness (Hs)>

The standard composition is subjected to primary press cure and secondary oven cure under the standard vulcanization conditions to give a sheet of 2 mm thickness, and the hardness thereof is measured according to JIS-K-6253.

<Vulcanization Properties>

A vulcanization curve at 170° C. is obtained at the time of conducting the primary press cure by using JSR curastometer model II and model V, and the minimum viscosity (ML), the vulcanization degree (MH), the induction time ($T_{10}$) and the optimum vulcanization time ($T_{90}$) are found.

<Measurement of Average Particle Size of Polymer>

The average particle size is measured by using Microtrac 9340 UPA (made by Honeywell International Inc.)

<Calculation of the Number of Particles>

Using the average particle size of polymer obtained above, the number of particles is calculated from the following formula:

$$\frac{\text{The number of polymer particles}} = \frac{\text{Polymer solid concentration}}{100 - (\text{Polymer solid concentration})} \Big/ \left\{ \frac{4}{3} \times 3.14 \times \left( \frac{\text{Average particle size (nm)}}{2} \times 10^{-9} \right)^3 \times \text{gravity} \times 10^6 \right\}$$

<Measurement of VdF Branch Ratio>

A sample for measurement is dissolved in acetone in a concentration of about 20%. The solution is subjected to measurement by $^{19}$F-NMR (AMX 500 type made by the Bruker Companies, and the branch peak area and the total $CF_2$ peak area are calculated using Mest Re-C 2.3a (made by Mest Re-C Technologies) as processing software, from which the branch ratio is found.

<Composition Analysis>

The composition was measured using $^{19}$F-NMR (AC 300P type made by the Bruker Companies), provided that the analysis of TFE-containing polymers was conducted by using $^{19}$F-NMR (FX100 type made by JEOL LTD.).

<Elemental Analysis>

It was measured by G2350A type made by Yokokawa Hewlett-Packard Company.

<Calculation Using Peng-Robinson Formula>

Aspen Plus Ver. 11.1 (made by Aspen Technology Inc.) was used. As to the critical temperature, critical pressure and eccentric factors of each monomer the values saved in the software were used.

| | | | |
|---|---|---|---|
| $T_c$: | VdF | 29.65° C. | |
| | TFE | 33.3° C. | |
| | HFP | 85.0° C. | |
| $P_c$: | VdF | 4.46 | MPa/SQCM |
| | TFE | 3.94 | MPa/SQCM |
| | HFP | 3.21 | MPa/SQCM |
| $\omega$: | VdF | 0.136 | |
| | TFE | 0.226 | |
| | HFP | 0.382 | |

REFERENCE EXAMPLE 1

Polymerization for Seed Polymer Particles

A 1.8 liter polymerization vessel equipped with an electromagnetic induction type stirring device as a stirring device was charged with 720 g of deionized water, 290 g of a 10% by weight aqueous solution of ammonium perfluorooctanate and 0.6 g of diethyl malonate. After the system was sufficiently replaced with nitrogen gas, the pressure was reduced. This procedure was repeated 3 times. Under reduced pressure, 20 g of VdF and 51 g of HFP were added thereto, and the temperature was raised to 80° C. with stirring. Subsequently, 0.02 g of ammonium persulfate (APS) dissolved in 0.6 g of deionized water was injected into the system by nitrogen gas to start polymerization. The polymerization pressure was set to 2 MPa, and in order to compensate for the pressure decrease during the polymerization, a monomer mixture of VdF/HFP (78/22 (% by mole)) was supplied continuously and the polymerization was conducted with stirring. By the completion of the polymerization, 215 g of the monomers were supplied to the vessel.

The weight of the obtained emulsion was 1,233 g, the polymer concentration thereof was 18.1% by weight, and the number of polymer particles in the emulsion was $1.2 \times 10^{16}$ per g of water. After 30 minutes, stirring was stopped and the monomers were discharged to stop the polymerization.

REFERENCE EXAMPLE 2

Polymerization for Seed Polymer Particles

A 1.8 liter polymerization vessel equipped with an electromagnetic induction type stirring device as a stirring device was charged with 809 g of deionized water, 200 g of a 10% by weight aqueous solution of ammonium perfluorooctanate. After the system was sufficiently replaced with nitrogen gas, the pressure was reduced. This procedure was repeated 3 times. Under reduced pressure, 0.5 mililiter of isopentane was charged into the vessel, and VdF, TFE and HFP were added thereto so that the composition of VdF/TFE/HFP in the vessel was 29.0/13.0/58.0 (% by mole) at 80° C. and the inner pressure of the vessel was 1.4 MPa. After the completion of the temperature elevation, 0.67 g of ammonium persulfate (APS) dissolved in 20 g of deionized water was injected into the system by nitrogen gas to start polymerization. The polymerization pressure was set to 1.4 MPa, and in order to compensate for the pressure decrease during the polymerization, a monomer mixture of VdF/TFE/HFP (50/20/30 (% by mole)) was supplied continuously and the polymerization was conducted with stirring. By the completion of the polymerization, 320 g of the monomers were supplied to the vessel.

The obtained emulsion had a weight of 1,285 g, a polymer concentration of 24.8% by weight, and $1.0 \times 10^{15}$ polymer particles per g of water. After 360 minutes, stirring was stopped and the monomers were discharged to stop the polymerization.

EXAMPLE 1

A 2.5 liter polymerization vessel equipped with the same electromagnetic induction type stirring device as in Reference Example 1 was charged with 1,324 g of deionized water, 33.5 g of an aqueous dispersion of the polymer particles prepared in Reference Example 1 and 19.1 g of a 10% by weight aqueous solution of ammonium perfluorooctanate. After the system was sufficiently replaced with nitrogen gas, the pressure was reduced. This procedure was repeated 3 times, and 171 g of VdF and 729 g of HFP were added under reduced pressure, and the temperature was raised to 80° C. with stirring. Subsequently, 2.98 g of octafluoro-1,4-diiodobutane and 0.068 g of APS dissolved in 15 g of deionized water were injected by nitrogen gas to start polymerization, and the polymerization was continued under the following conditions (a) to (c). After 4.3 hours, stirring was stopped and the monomers were discharged to stop the polymerization.

(a) The critical temperature and critical pressure of the composition VdF/HFP=36/64 (% by mole) in the polymerization vessel were calculated by the Peng-Robinson formula using Aspen Plus Ver. 11.1, and $T_c$=87.7° C. and $P_c$=3.05 MPa were found. Furthermore, conversion was conducted by reduced temperature ($T_R$) 0.95 and reduced pressure ($P_R$) 0.80 to give T=69.7° C. and P=2.44 MPa, which showed the polymerization conditions of this Example were at least the reduced temperature and at least the reduced pressure.
(b) A monomer mixture of VdF/HFP (95/5% by mole) was supplied continuously to maintain the pressure of the gaseous phase at 6 MPa. By the completion of the polymerization, 302 g of the monomers were supplied to the vessel.
(c) The stirring speed was maintained at 560 rpm.
(d) Three hours later from the start of the polymerization, 0.034 g of APS dissolved in 15 g of deionized water was added.

The obtained emulsion had a weight of 1,879 g, a polymer concentration of 29.6% by weight, and $2.7 \times 10^{14}$ polymer particles per g of water. The amount of the fluorine-containing elastomer was 566 g. The elastomer had a weight average molecular weight Mw of 236,000 and a number average molecular weight Mn of 113,000, which were measured by GPC, and Mw/Mn was 2.1. The composition of the polymer measured by $^{19}$F-NMR was VdF/HFP=77.4/22.6 (% by mole).

EXAMPLE 2

A fluorine-containing elastomer was prepared in the same manner as in Example 1 except that 0.17 g of APS was used.

The polymerization time was 1.5 hours. The obtained emulsion had a weight of 1,909 g, a polymer concentration of 30.1% by weight, and $2.9 \times 10^{14}$ polymer particles per g of water. The amount of the fluorine-containing elastomer was 575 g. The elastomer had a weight average molecular weight Mw of 277,000 and a number average molecular weight Mn of 103,000, which were measured by GPC, and Mw/Mn was 2.7. The composition of the polymer measured by $^{19}$F-NMR was VdF/HFP=76/24 (% by mole).

EXAMPLE 3

A fluorine-containing elastomer was prepared in the same manner as in Example 1 except that 5.96 g of octafluoro-1,4-diiodobutane was used.

The polymerization time was 3.4 hours. The obtained emulsion had a weight of 1,899 g, a polymer concentration of 28.6% by weight, and $2.6 \times 10^{14}$ polymer particles per g of water. The amount of the fluorine-containing elastomer was 543 g. The elastomer had a weight average molecular weight Mw of 105,000 and a number average molecular weight Mn of 56,300, which were measured by GPC, and Mw/Mn was 1.9. The composition of the polymer measured by $^{19}$F-NMR was VdF/HFP=77/23 (% by mole).

COMPARATIVE EXAMPLE 1

A 2.5 liter polymerization vessel equipped with the same electromagnetic induction type stirring device as in Reference Example 1 was charged with 1,324 g of deionized water, 33.5 g of an aqueous dispersion of the polymer particles prepared in Reference Example 1 and 19.1 g of a 10% by weight aqueous solution of ammonium perfluorooctanate. After the system was sufficiently replaced with nitrogen gas, the pressure was reduced. This procedure was repeated 3 times, and 20 g of VdF and 57 g of HFP were added to the vessel under reduced pressure, and the temperature was raised to 80° C. with stirring. Subsequently, 2.98 g of octafluoro-1,4-diiodobutane and 0.068 g of APS dissolved in 15 g of deionized water were injected by nitrogen gas to start polymerization, and the polymerization was continued under the following conditions (a) to (d). After 16.5 hours, stirring was stopped and the monomers were discharged to stop the polymerization.

(a) The critical temperature and critical pressure of the composition VdF/HFP=50/50 (% by mole) in the polymerization vessel were calculated by the Peng-Robinson formula using Aspen Plus Ver. 11.1, and $T_c$=57.3° C. and $P_c$=3.83 MPa were found. Furthermore, conversion was conducted by reduced temperature ($T_R$) 0.95 and reduced pressure ($P_R$) 0.80 to give T=40.8° C. and P=3.06 MPa, which showed the polymerization conditions of this Reference Example were at least the reduced temperature and at most the reduced pressure.
(b) A monomer mixture of VdF/HFP (78/22% by mole) was supplied continuously to maintain the pressure of the gaseous phase at 1.5 MPa. By the completion of the polymerization, 570 g of the monomers were supplied to the vessel.
(c) The stirring speed was maintained at 560 rpm.
(d) Every three hours during the polymerization, 0.034 g of APS dissolved in 15 g of deionized water was added.

The obtained emulsion had a weight of 2,087 g, a polymer concentration of 27.7% by weight, and $1.4 \times 10^{14}$ polymer particles per g of water. The amount of the fluorine-containing elastomer was 578 g. The elastomer had a weight average molecular weight Mw of 183,000 and a number average molecular weight Mn of 133,000, which were measured by GPC, and Mw/Mn was 1.4. The composition of the polymer measured by $^{19}$F-NMR was VdF/HFP=77.3/22.7 (% by mole).

EXAMPLES 4 TO 6 AND COMPARATIVE EXAMPLE 2

Fluorine-containing molded articles were obtained according to the following recipe and vulcanization conditions using the fluorine-containing elastomers obtained in Examples 1 to 3 and Comparative Example 1. The results of evaluation are shown in Table 1.

Standard Composition

| Fluorine-containing elastomer | 100 parts by weight |
| --- | --- |
| Triallyl isocyanurate (TAIC) | 4 parts by weight |
| Perhexa 25B | 1.5 parts by weight |
| Carbon black MT-C | 20 parts by weight |

Standard Vulcanization Conditions

Kneading method: Roll kneading
Press cure: 10 minutes at 160° C.
Oven cure: 4 hours at 180° C.

TABLE 1

|  | unit | Ex. 4 | Ex. 5 | Ex. 6 | Com. Ex. 2 |
| --- | --- | --- | --- | --- | --- |
| Polymer composition |  |  |  |  |  |
| VdF/HFP | % by mole | 77.3/22.7 | 76.0/24.0 | 77.1/22.9 | 77.3/22.7 |
| Branch ratio | ppm | 138 | 136 | 124 | 337 |
| Iodine content | % by weight | 0.21 | 0.20 | 0.53 | 0.17 |
| Number average molecular weight (MN) |  | 1.13E+05 | 1.03E+05 | 5.63E+04 | 1.33E+05 |
| Mooney viscosity of polymer ML1 + 10, 100° C. |  | 65 | 58 | 11 | 71 |
| Curastometer model II (160° C.) |  |  |  |  |  |
| Minimum torque (ML) | kgf | 0.08 | 0.08 | 0.03 | 0.09 |
| Degree of vurcanization (MH) | kgf | 4.02 | 3.22 | 4.13 | 3.48 |
| Induction time (T10) | min. | 1.00 | 0.80 | 1.10 | 0.80 |
| Optimum vulcanization time (T90) | min. | 2.30 | 2.10 | 2.90 | 2.00 |
| 100% Modulus | MPa | 2.1 | 2.0 | 2.7 | 1.9 |
| Tensile strength at break | MPa | 22.9 | 21.9 | 18.5 | 22.6 |
| Elongation at break | % | 430 | 410 | 300 | 480 |
| Hardness (shore A) peak value |  | 66 | 67 | 68 | 67 |
| Compression set |  |  |  |  |  |
| (25° C. × 72 hrs) | % | 9.3 | 9.4 | 7.2 | 14.4 |
| (200° C. × 72 hrs) | % | 24.7 | 24.5 | 20.4 | 32.2 |

EXAMPLE 7

A 1.8 liter polymerization vessel equipped with the same electromagnetic induction type stirring device as in Reference Example 1 was charged with 970 g of deionized water and 27 g of an aqueous dispersion of the polymer particles prepared in Reference Example 2. After the system was sufficiently replaced with nitrogen gas, the pressure was reduced. This procedure was repeated 3 times, and 18 g of VdF, 22 g of TFE and 537 g of HFP were added under reduced pressure, and the temperature was raised to 80° C. with stirring. Subsequently, 2.8 g of octafluoro-1,4-diiodobutane and 0.05 g of APS dissolved in 15 g of deionized water were injected by nitrogen gas to start polymerization, and the polymerization was continued under the following conditions (a) to (c). After 3.6 hours, stirring was stopped and the monomers were discharged to stop the polymerization.

(a) The critical temperature and critical pressure of the composition VdF/TFE/HFP=6.5/5.0/88.5 (% by mole) in the polymerization vessel were calculated by the Peng-Robinson formula using Aspen Plus Ver. 11.1, and $T_c$=87.7° C. and $P_c$=3.05 MPa were found. Furthermore, conversion was conducted by reduced temperature ($T_R$) 0.95 and reduced pressure ($P_R$) 0.80 to give T=69.7° C. and P=2.44 MPa, which showed the polymerization conditions of this Example were at least the reduced temperature and at least the reduced pressure.

(b) A monomer mixture of VdF/TFE/HFP (68.0/23.8/8.2% by mole) was supplied continuously to maintain the pressure of the gaseous phase at 3.5 MPa. By the completion of the polymerization, 247 g of the monomers were supplied to the vessel.

(c) The stirring speed was maintained at 560 rpm.

The obtained emulsion had a weight of 1,368 g and a polymer concentration of 26.8% by weight. The number of polymer particles was $9.5 \times 10^{14}$ per g of water. The amount of the fluorine-containing elastomer was 369 g. The elastomer had a weight average molecular weight Mw of 67,000 and a number average molecular weight Mn of 48,000, which were measured by GPC, and Mw/Mn was 1.4. The composition of the polymer measured by $^{19}$F-NMR was VdF/TFE/HFP=50.7/19.5/29.8 (% by mole).

EXAMPLE 8

Polymerization for a fluorine-containing elastomer was conducted in the same manner as in Example 7 except that 2.4 g of octafluoro-1,4-diiodobutane was used.

The polymerization time was 4.2 hours. The obtained emulsion had a weight of 1,401 g, a polymer concentration of 28.6% by weight, and $3.5 \times 10^{14}$ polymer particles per g of water. The amount of the fluorine-containing elastomer was 396 g. The elastomer had a weight average molecular weight Mw of 87,000 and a number average molecular weight Mn of 57,000, which were measured by GPC, and Mw/Mn was 1.5. The composition of the polymer measured by $^{19}$F-NMR was VdF/TFE/HFP=51.0/19.8/29.2 (% by mole).

EXAMPLE 9

Polymerization for a fluorine-containing elastomer was conducted in the same manner as in Example 7 except that (a) 2.4 g of octafluoro-1,4-diiodobutane was used, (b) 3.96 g of $CF_2$=$CFOCF_2CF_2CH_2I$ was added when 50% of the monomers charged were consumed, and (c) 0.025 g of APS dissolved in 15 g of deionized water was added every three hours during the polymerization.

The polymerization time was 3.8 hours. The obtained emulsion had a weight of 1,391 g, a polymer concentration of 27.3% by weight, and $8.3 \times 10^{14}$ polymer particles per g of water. The amount of the fluorine-containing elastomer was 384 g. The elastomer had a weight average molecular weight Mw of 92,000 and a number average molecular weight Mn of 59,000, which were measured by GPC, and Mw/Mn was 1.6. The composition of the polymer measured by $^{19}$F-NMR was VdF/TFE/HFP=52.0/20.7/27.3 (% by mole).

COMPARATIVE EXAMPLE 3

A 1.83 liter polymerization vessel equipped with the same electromagnetic induction type stirring device as in Reference Example 7 was charged with 970 g of deionized water and 27 g of an aqueous dispersion of the polymer particles prepared in Reference Example 2. After the system was sufficiently replaced with nitrogen gas, the pressure was reduced. This procedure was repeated 3 times, and VdF, TFE and HFP were added to the vessel so that the composition of VdF/TFE/HFP in the vessel was 11.0/19.0/70.0 (% by mole) at 80° C. and the inner pressure of the vessel was 1.5 MPa. Subsequently, 1.7 g of octafluoro-1,4-diiodobutane and 0.05 g of APS dissolved in 15 g of deionized water were injected by nitrogen gas to start polymerization, and the polymerization was continued under the following conditions (a) to (d). After 15.3 hours, stirring was stopped and the monomers were discharged to stop the polymerization.

(a) The critical temperature and critical pressure of the composition VdF/TFE/HFP=11/19/70 (% by mole) in the polymerization vessel were calculated by the Peng-Robinson formula using Aspen Plus Ver. 11.1, and $T_c=69.0°$ C. and $P_c=3.48$ MP were found. Furthermore, conversion was conducted by reduced temperature $(T_R)$ 0.95 and reduced pressure $(P_R)$ 0.80 to give T=51.9° C. and P=2.78 MPa, which showed the polymerization conditions of this Comparative Example were at least the reduced temperature and at most the reduced pressure.
(b) A monomer mixture of VdF/TFE/HFP (50.0/20.0/30.0% by mole) was supplied continuously to maintain the pressure of the gaseous phase at 1.5 MPa. By the completion of the polymerization, 370 g of the monomers were supplied to the vessel.
(c) The stirring speed was maintained at 560 rpm.
(d) Every three hours during the polymerization, 0.25 g of APS dissolved in 15 g of deionized water was added.

The obtained emulsion had a weight of 1,410 g, a polymer concentration of 26.2% by weight and $3.9 \times 10^{14}$ polymer particles per g of water. The amount of the fluorine-containing elastomer was 370 g. The elastomer had a weight average molecular weight Mw of 85,000 and a number average molecular weight Mn of 61,000, which were measured by GPC, and Mw/Mn was 1.4. The composition of the polymer measured by $^{19}$F-NMR was VdF/TFE/HFP=50.2/19.8/30.0 (% by mole).

EXAMPLES 10 TO 12 AND COMPARATIVE EXAMPLE 4

Fluorine-containing molded articles were obtained according to the following standard composition and vulcanization conditions using the fluorine-containing polymers obtained in Examples 7 to 9 and Comparative Example 3. Evaluations are shown in Table 2.

Standard Composition

| | |
|---|---|
| Fluorine-containing elastomer | 100 parts by weight |
| Triallyl isocyanurate (TAIC) | 4 parts by weight |
| Perhexa 25B | 1.5 parts by weight |
| Carbon black MT-C | 20 parts by weight |

Standard Vulcanization Conditions

Kneading method: Roll kneading
Press cure: 10 minutes at 160° C.
Oven cure: 4 hours at 180° C.

TABLE 2

| | unit | Ex. 10 | Ex. 11 | Ex. 12 | Com. Ex. 4 |
|---|---|---|---|---|---|
| Polymer composition | | | | | |
| VdF/TFE/HFP | % by mole | 50.7/19.5/29.8 | 51.0/19.8/29.2 | 52.0/20.7/27.3 | 50.2/19.8/30.0 |
| Iodine content | % by weight | 0.32 | 0.26 | 0.40 | 0.23 |
| Number average molecular weight (MN) | | 4.8E+05 | 5.7E+05 | 5.9E+05 | 6.1E+05 |
| Mooney viscosity of polymer ML1 + 10, 100° C. | | 20 | 46 | 27 | 48 |
| Curastometer model II (160° C.) | | | | | |
| Minimum torque (ML) | kgf | 0.1 | 0.2 | 0.1 | 0.1 |
| Degree of vulcanization (MH) | kgf | 5.0 | 4.9 | 5.1 | 4.7 |
| Induction time (T10) | min. | 1.0 | 1.0 | 0.8 | 1.0 |
| Optimum vulcanization time (T90) | min. | 2.3 | 2.4 | 2.2 | 2.4 |
| 100% Modulus | MPa | 3.9 | 3.6 | 5.1 | 3.3 |
| Tensile strength at break | MPa | 20.2 | 19.5 | 18.0 | 21.2 |
| Elongation at break | % | 310 | 320 | 210 | 320 |
| Hardness (shore A) peak value | | 74 | 73 | 73 | 73 |
| Compression set | | | | | |
| (200° C. × 72 hrs) | % | 16.5 | 18.5 | 12.4 | 22.5 |

INDUSTRIAL APPLICABILITY

In the present invention, polymerization speed is greatly increased, despite that the amount of a polymerization initiator is small, by carrying out iodine transfer polymerization under a high pressure, and thus the invention provides a process for preparing a fluorine-containing elastomer in a high productivity comparable to that of non-iodine transfer polymerization. The elastomers prepared by the process have a few branches and a high terminal iodine atom content, and give fluorine-containing molded articles having a good balance between compression set and elongation at break.

The invention claimed is:

1. A process for preparing a fluorine-containing elastomer vulcanizable by peroxide vulcanization, which is a batch copolymerization process conducted under conditions that the reduced temperature of the critical constant is at least 0.95 and the reduced pressure of the critical constant is at least 0.80 wherein the reduced temperature and the reduced pressure are calculated using the Peng-Robinson formula from the critical temperature, the critical pressure and the composition ratio of each of the monomers in the gaseous phase in the reaction vessel,
wherein monomers comprising at least one fluoroolefin are copolymerized in the presence of water, an emulsifier and a compound having the formula: $R_f^1 \cdot I_x$ wherein $R_f^1$ is a saturated or unsaturated fluorohydrocarbon or chlorofluorohydrocarbon group having 1 to 16 carbon atoms, and x is the number of bonds of $R_f^1$ and an integer of 1 to 4.

2. The process for preparing the fluorine-containing elastomer vulcanizable by peroxide vulcanization of claim 1, wherein the inner pressure of the vessel during the polymerization is at least 3 MPa.

3. The process for preparing the fluorine-containing elastomer vulcanizable by peroxide vulcanization of claim 1, wherein the number of particles of the fluorine-containing elastomer is at least $5 \times 10^{13}$ per 1 g of water when the polymerization is finished.

4. The process for preparing the fluorine-containing elastomer vulcanizable by peroxide vulcanization of claim 1, wherein the fluoroolefin is a compound having the formula:

$$CX^1X^2 = CX^3X^4$$

wherein $X^1$ to $X^3$ are each a hydrogen atom or a halogen atom, and $X^4$ is a hydrogen atom, a halogen atom, a carboxyl group, an alkyl group having 1 to 9 carbon atoms in which a part or all of the hydrogen atoms are substituted by fluorine atom and which may include an ether bonding oxygen atom, or an alkoxyl group having 1 to 9 carbon atoms in which a part or all of the hydrogen atoms are substituted by fluorine atom and which may include an ether bonding oxygen atom, and wherein the fluoroolefin contains at least one fluorine atom.

5. The process for preparing the fluorine-containing elastomer vulcanizable by peroxide vulcanization of claim 1, wherein the fluoroolefin contains a compound selected from the group consisting of hexafluoropropylene, tetrafluoroethylene, trifluoroethylene, pentafluoropropylene, vinyl fluoride, hexafluoroisobutene, perfluoro(alkyl vinyl ethers), and polyfluorodienes, or wherein the fluoroolefin contains a compound having the following formula:

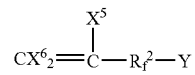

wherein Y is —$CH_2I$, —OH, —COOH, —$SO_2F$, —$SO_3M$ in which M is hydrogen, $NH_4$ group or an alkali metal, a carboxylic acid salt, a carboxylic ester group, an epoxy group, a nitrile group or an iodine atom, $X^5$ and $X^6$ are the same or different and each is a hydrogen atom or a fluorine atom, $R_f^2$ is a bivalent fluorine-containing alkylene group having 0 to 40 carbon atoms which may include an ether bonding oxygen atom.

6. A fluorine-containing elastomer vulcanizable by peroxide vulcanization which is obtained by the preparation process of claim 1 and has a Mooney viscosity of at least 30 at 1000° C.

* * * * *